Jan. 20, 1959   D. O. BENSON   2,869,310
EXTRUDED CUTTER REELS FOR MOWERS AND THE LIKE
Filed March 28, 1955
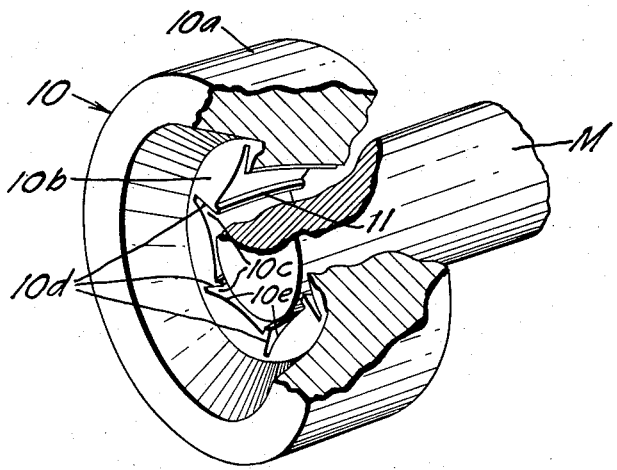
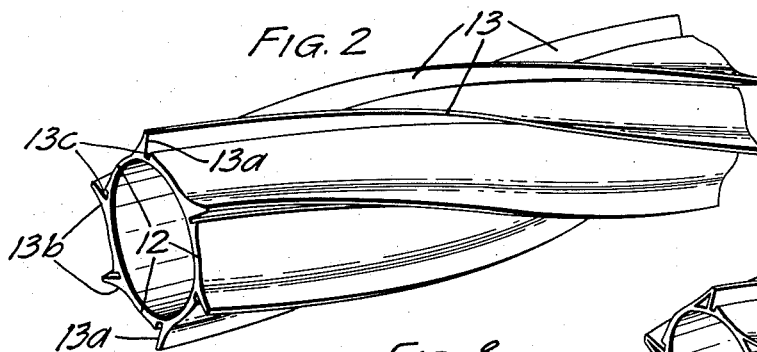
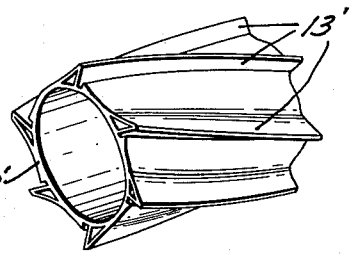
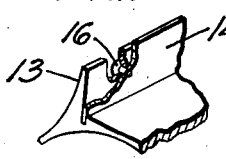
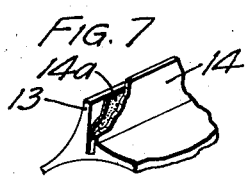
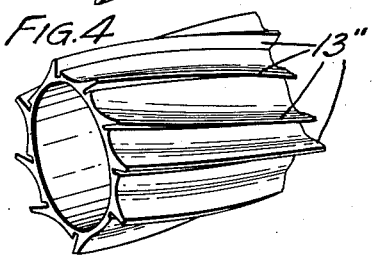
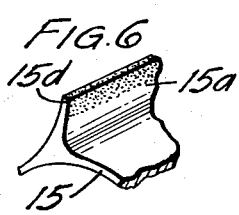
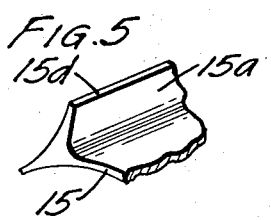
INVENTOR
DONALD O. BENSON
BY
Williamson, Schroeder, Adams & Meyers
ATTORNEYS

United States Patent Office 2,869,310
Patented Jan. 20, 1959

2,869,310

EXTRUDED CUTTER REELS FOR MOWERS AND THE LIKE

Donald O. Benson, Minneapolis, Minn., assignor to Toro Manufacturing Corporation of Minnesota, Minneapolis, Minn., a corporation of Minnesota Application March 28, 1955, Serial No. 497,083

5 Claims. (Cl. 56—294)

This invention relates to integrally formed, extruded cutter reels or reel cores for lawn mowers and other revoluble analogous cutting mechanisms which is usually associated in operation with a stationary bed knife.

My invention has particular reference to mower cutter reels and the like extruded integrally from metals and metal alloys for the economical manufacture and production of a reel having a generally cylindrical and preferably tubular hub portion, and provided with a series of longitudinally extending, circumferentially spaced protruding blades or blade holders.

It is an object of my invention to provide a very economical and highly efficient cutter reel or the like, having a multiplicity of circumferentially spaced cutter blades or blade supports integrally formed therewith, and produced as an article of manufacture by process of extrusion.

Another object is the provision of a simple and commercially practical process of manufacturing at very low cost and with substantial saving in material, of cutter reels of the class described.

A further object is the manufacture and provision of a plurality of extruded cutter reels of novel construction and low cost from a continuous extrusion stock.

More specifically, in the process of manufacture it is an object to provide for extrusion of my novel devices through the employment of novel "rifled" dies and closely cooperating elements to the end that devices of improved structure and functions may be commercially made at substantial savings in labor, assembly and consumption of material.

These and other objects and advantages of my invention will more fully appear from the following description made in connection with the accompanying drawings, wherein like reference characters refer to the same or similar parts throughout the several views, and in which:

Fig. 1 is a perspective view with portions broken away showing an embodiment of my spiral extrusion die for locked connection with a discharge of an extrusion press and also showing a portion of a mandrel utilized for hollow cutter reel extrusion;

Fig. 2 is a perspective view showing a portion of an extrusion stock embodying my invention and from which a number of cutter reels or reel cores may be sectionally cut;

Figs. 3 and 4 are similar perspective views showing alternative forms of extruded stock from which a plurality of cutter reels may be sectionally cut;

Fig. 5 is a fragmentary perspective view showing a portion of a reel and one of its blades wherein one side of the blade and the cutting edges formed by a hard anodized face;

Fig. 6 is a similar view where the face and cutting edge is provided with metalizing of steel on the extrusion;

Fig. 7 is a view similar to Figs. 5 and 6 showing attachment of a spirally extending blade member through cementing process; and Fig. 8 is a similar view showing attachment of a steel cutting blade by riveting.

Referring to the drawings herein, the die parts and mandrel illustrated in Fig. 1 are adapted to be operatively affixed to the discharge end of a suitable type of extrusion press, (not shown). In operation it will be understood that the generally annular die member 10 illustrated in Fig. 1 is non-rotatably affixed within the tool container mechanism of the extrusion press.

Annular die 10 as shown has a cylindrical external periphery 10a, and the rearwardly disposed generally annular internal die flange 10b which has formed therein from the general annular inner periphery a plurality of circumferentially spaced "rifled" channels 10c spirally and longitudinally extending through the short length of the collar or flange 10b. Outwardly of the die flange 10b annular member 10 is enlarged to form a cylindrical, internal discharge passage.

In the embodiment of my die illustrated in Fig. 1, the channels or riflings 10c are defined along substantially straight, cross sectional side surfaces 10d, which extend at angles slightly less than perpendicular from the cylindrical, general inner contour of die collar 10b, with opposed, gradually curved (in cross section) channel sides 10e, merging and curving into the cylindrical contour of the inner periphery. The channels 10c diminish or taper in cross sectional width from their open or inner portions thereof to the channel extremities, which terminate some distance inwardly of the marginal edge of the die collar or flange 10b.

It will further be noted that in the embodiment of the die illustrated in Fig. 1, narrow, spirally arranged rib portions 11 are formed between the respective channels 10c, each rib 11 being immediately adjacent one of the cross sectional, straight sides of the channel, to form in the produced extrusion, inwardly extending seats for receiving such longitudinal elements as a spiralled, attachable blade, plate, or the like.

My tools, as shown in the embodiment illustrated in Fig. 1, include an elongated mandrel M (previously referred to) which may be affixed to the forward end of the ram of the extrusion press and which is related to the die member 10b, as shown in Fig. 1, for longitudinal movement with the ram in close, spaced relation to the inner periphery of the stationary, rifled die, thus producing a tubular, generally hollow extrusion in the particular embodiment of tools or dies illustrated in Fig. 1.

In Fig. 2 a longitudinal portion of an integral extrusion for forming a plurality of rotary cutter reels or the like, is illustrated having a generally tubular and cylindrical body portion or hub 12 having a longitudinally and spirally extending ribs or blades 13 spaced circumferentially apart and protruding from the hub or body 12, and extending substantially the full length of the extrusion stock formed.

It will of course be understood that I by no means limit myself to hollow or tubular extrusions for cutter reels and the like, although the same are preferred because substantial economy in the weight of the material is obtained as contrasted with my other types of solid body, extruded cutter reels.

Referring again to the cutter reel stock of Fig. 2, it will be noted that the blades or ribs 13 are defined in cross section on one side thereof by straight walls or surfaces 13a extending nearly but preferably just short of perpendicular relation to the point of tangency of said straight walls to the hub portion 12, and continued inwardly to form the spiral notches or longitudinal grooves 13c for reception if desired of attachable steel cutter blades or the like 14, as shown in Figs. 7 and 8. The opposite sides of the spiralled longitudinal blades 13, cross sectionally are shaped in curved formation (at 13b)

into the generally cylindrical peripheral contour of the hub or body 12.

The generally cross sectional shape of the blades or ribs 13 are therefore V-shaped, tapering in cross section to their protruding outer edges. Consequently the said ribs or blades and their integral connection with the body or hub provide a very strong and durable construction, particularly in view of the relatively small amount of extrudible material required in my invention.

In Fig. 3 a longitudinal portion of an extruded stock embodying my invention is illustrated of generally similar construction to the cutter reel stock of Fig. 2, having the generally cylindrical body or hub 12′, with the protruding, circumferentially spaced blades 13′ integrally formed therewith.

The blades 13′ of this embodiment, however, are hollow, having longitudinal recesses defined or formed by core elements of triangular cross section provided in conjunction and in addition to the die and tools illustrated in Fig. 1. This extruded construction of cutter reels or cutter reel cores and the like saves additional material and further lessens the overall weight as contrasted with the cutter reel stock of the embodiment of Fig. 2.

In Fig. 4 another embodiment of cutter reel stock or cuter reel core is illustrated having a substantially increased number of circumferentially spaced, longitudinally and spirally extending blades, or blade holders 13″. The extrusion of the cutter reel stock of Fig. 4 of course requires the provision of specifically different dies than that illustrated in Fig. 1, all within the scope of the invention, and the principal die collar or flange having spiralled riflings of a number and properly spaced as is evident to produce the blades or ribs 13″.

It will of course be understood that in the manufacture of mower or other cutter reels and analogous rotary devices or the cores thereof, that the elongated extrusion stock such as is exemplified in Figs. 2 to 4, inclusive, will be sectionally cut in planes perpendicular to the axis of extrusion to complete the finished article of manufacture. The article may then constitute a complete cutter reel or the main core for a cutter reel, depending upon, in accordance with my invention, whether the effective edges of the ribs or blades are conditioned for cutting grass and other material or whether, as shown in Figs. 7 and 8, steel blades 14 independently manufactured are attached and seated in the spiral seating grooves 13c.

In Fig. 5 the longitudinal extreme edge 15d and the cross sectionally, straight leading surface 15a, (of a cutter reel extrusion having a tubular and cylindrical body 15) are anodized or otherwise chemically treated or electro-plated to provide adequate hardness for cooperation in cutting with a conventional, stationary bedknife.

As shown in Fig. 6, a cutter reel extrusion similar to that shown in Fig. 5, is provided having a longitudinal protruding edge 15d of the blades or ribs thereof, as well as the outer portion of the leading, cross sectionally straight line surface 15a, metalized or covered with a firmly adhered coating of hard metal or other material.

In Fig. 7 a cutter reel extrusion of identical form to that shown in Fig. 2 is illustrated, constituting the entire core of the cutter reel but having the longitudinal and spiralled steel cutting blades 14 permanently cemented to the leading, cross sectionally straight faces of the blades 13 by a suitable cement or bonding material 14a. The inner longitudinal edges of the blades 14 are seated in the spiral extending longitudinal grooves 13c of the extrusion.

In Fig. 8 a substantially analogous construction is shown wherein the spiral extending longitudinal steel cutter blades 14 are secured to the respective ribs or blades 13 by a series of spaced rivets 16.

From the foregoing description it will be seen that an exceedingly strong, durable rotary cutter reel for mowers and other devices has been provided by my discoveries and inventions, adapted to be inexpensively manufactured from a number of extrudible metals and metal alloys. The cutter reels or cutter reel cores and similar rotary cutter devices embodying my article of manufacture and invention do not require assembly of a number of parts or the utilization of the weight of materials now employed in commercial cutter reel structures.

Furthermore, through my extrusion method very uniformly spiralled ribs or blades are produced within a range of pitches. Each of the blades is uniformly attached (preferably integrally) along its entire inner edge to the hub or body of the device. It will of course be understood that various changes may be made in the form, details, arrangement of parts and sequence of process steps, all within the scope of my invention.

It will of course be understood that my cutter reels or cutter reel cores are sectionally cut as described herein from the extrusion stock, and may be readily coupled in a lawn mower or other device with the journals provided and/or with the driving connections for said journals or parts.

What is claimed is:

1. In lawn mower construction an integrally formed cutter reel member comprising an elongated cylindrical hub extending substantially the full length of said member and a multiplicity of integrally formed, gently spiralled, longitudinal blades emanating from said hub throughout substantially their entire length and forming a closed structure with said hub, said blades having longitudinal cutting edges and leading faces adjacent thereto, the longitudinal edges of said blades generating in revolution of said member, a cylindrical figure which is substantially coaxial with said cylindrical hub and wherein the leading faces of said blades form forwardly directed acute angles with radii of said cylinder passing through the lines of juncture thereof with said cylindrical hub whereby with said closed blade and hub construction forward blower action upon the grass to be cut is substantially eliminated and distortion of the cutting edges from the striking of an obstacle does not substantially affect shearing fit with the bed knife of the mower.

2. Apparatus as defined in claim 1 wherein the entire member including said closed multi blade and hub construction is longitudinally extruded from metal, thereby graining the blades longitudinally to resist breakage in operation and to facilitate shearing fit with the bed knife of the mower.

3. Apparatus as defined in claim 1 wherein said blades taper in cross-sectional thickness from their point of juncture with said hub to said longitudinal edges.

4. Apparatus as defined in claim 1 wherein said blades are hollow longitudinally throughout and have a generally V-shape cross-section.

5. Apparatus as defined in claim 1 wherein said cylindrical hub has a plurality of longitudinal spirally arranged grooves therein, each of said grooves being disposed in juxtaposition to one of said leading faces of the blades.

References Cited in the file of this patent

UNITED STATES PATENTS

| | | |
|---|---|---|
| 41,963 | Miller et al. | Mar. 15, 1864 |
| 684,144 | Waterhouse | Oct. 8, 1901 |
| 1,171,593 | Coldwell | Feb. 15, 1916 |
| 1,705,810 | Driest | Mar. 19, 1929 |
| 1,882,195 | Sharp | Oct. 11, 1932 |
| 1,907,897 | Swegles | May 9, 1933 |
| 1,979,615 | Grayson | Nov. 6, 1934 |
| 2,045,386 | Gottschalk | June 23, 1936 |
| 2,495,372 | Goldberg | Jan. 24, 1950 |
| 2,496,022 | Remonte | Jan. 31, 1950 |
| 2,503,824 | Hunter et al. | Apr. 11, 1950 |
| 2,521,262 | Smith | Sept. 5, 1950 |
| 2,630,668 | McDermott | Mar. 10, 1953 |